United States Patent
Ikeda et al.

(10) Patent No.: US 10,167,777 B2
(45) Date of Patent: Jan. 1, 2019

(54) SYSTEM AND METHOD FOR PRODUCING HYDROGEN

(71) Applicant: CHIYODA CORPORATION, Yokohama-shi, Kanagawa (JP)

(72) Inventors: Osamu Ikeda, Yokohama (JP); Tomoyuki Mikuriya, Yokohama (JP); Toshiki Furukawa, Yokohama (JP); Yuhi Ozaki, Yokohama (JP)

(73) Assignee: Chiyoda Corporation, Kanagawa (JP)

( * ) Notice: Subject to any disclaimer, the term of this patent is extended or adjusted under 35 U.S.C. 154(b) by 344 days.

(21) Appl. No.: 15/125,272

(22) PCT Filed: Mar. 25, 2015

(86) PCT No.: PCT/JP2015/001706
§ 371 (c)(1),
(2) Date: Sep. 12, 2016

(87) PCT Pub. No.: WO2015/146170
PCT Pub. Date: Oct. 1, 2015

(65) Prior Publication Data
US 2017/0074163 A1 Mar. 16, 2017

(30) Foreign Application Priority Data
Mar. 26, 2014 (JP) .................. 2014-064627

(51) Int. Cl.
*F02C 6/18* (2006.01)
*F02C 3/22* (2006.01)
(Continued)

(52) U.S. Cl.
CPC .............. *F02C 3/22* (2013.01); *C01B 3/26* (2013.01); *C10L 3/00* (2013.01); *F01K 5/02* (2013.01);
(Continued)

(58) Field of Classification Search
CPC .... C01B 2203/0277; C01B 2203/0822; C01B 2203/1058; C01B 2203/1064;
(Continued)

(56) References Cited

U.S. PATENT DOCUMENTS 7,351,395 B1 * 4/2008 Pez .................. C01B 3/0015
206/0.7
8,397,680 B2 * 3/2013 Shimada ............... B60W 20/10
123/3
(Continued)

FOREIGN PATENT DOCUMENTS

| JP | 2004197705 A | 7/2004 |
| JP | 2012206909 A | 10/2012 |
| JP | 2013067588 A | 4/2013 |

OTHER PUBLICATIONS

International Search Report of International Application No. PCT/JP2015/001706, dated Jun. 16, 2015, 2 pages.
(Continued)

*Primary Examiner* — Jesse Bogue
(74) *Attorney, Agent, or Firm* — Armstrong Teasdale LLP (57) ABSTRACT

Provided is a system and a method which allow hydrogen to be produced both efficiently and in a stable manner when using exhaust gas produced by power generation as a heat source for the dehydrogenation reaction, controlling the temperature of the dehydrogenation reaction within an appropriate range. The system (1) for producing hydrogen comprises a dehydrogenation reaction unit (51) for producing hydrogen from an organic hydride by a dehydrogenation reaction in presence of a dehydrogenation catalyst; a first power generation unit (2) for generating electric power from energy of combustion gas produced by combustion of fuel; a waste heat recovery unit (3) for receiving heat from exhaust gas expelled from the first power generation unit; a heat exchanger (21) provided in the waste heat recovery unit
(Continued)

for exchanging heat between the exhaust gas and a heat medium; and a circulation line (L1-L3) for introducing the heat medium heated in the heat exchanger to the dehydrogenation reaction unit in liquid form, and returning the heat medium expelled from the dehydrogenation reaction unit to the heat exchanger; wherein the heat medium is introduced into the dehydrogenation reaction unit at an introduction temperature ranging between 352° C. and 392° C., the heat medium is expelled from the dehydrogenation reaction unit at an expulsion temperature ranging between 337 ° C. and 367 ° C., and a difference between the introduction temperature and the expulsion temperature ranges between 10° C. and 50° C.

8 Claims, 2 Drawing Sheets

(51) Int. Cl.
| | | |
|---|---|---|
| *C01B 3/26* | (2006.01) | |
| *F01K 23/10* | (2006.01) | |
| *F02C 3/30* | (2006.01) | |
| *F02C 6/04* | (2006.01) | |
| *F23R 3/00* | (2006.01) | |
| *F01K 5/02* | (2006.01) | |
| *C10L 3/00* | (2006.01) | |
| *F02C 7/22* | (2006.01) | |

(52) U.S. Cl.
CPC ............... *F01K 23/10* (2013.01); *F02C 3/30* (2013.01); *F02C 6/04* (2013.01); *F02C 6/18* (2013.01); *F02C 7/22* (2013.01); *F23R 3/00* (2013.01); *C01B 2203/0277* (2013.01); *C01B 2203/0822* (2013.01); *C01B 2203/107* (2013.01); *C01B 2203/1058* (2013.01); *C01B 2203/1064* (2013.01); *C01B 2203/1235* (2013.01); *C01B 2203/1252* (2013.01); *C01B 2203/84* (2013.01); *Y02E 20/14* (2013.01); *Y02E 20/16* (2013.01); *Y02P 20/124* (2015.11); *Y02P 20/129* (2015.11)

(58) Field of Classification Search
CPC ...... C01B 2203/107; C01B 2203/1235; C01B 2203/1252; C01B 2203/84; C01B 3/26; C10L 3/00; F01K 23/10; F01K 5/02; F02C 3/22
See application file for complete search history.

(56) References Cited

U.S. PATENT DOCUMENTS

| | | | | |
|---|---|---|---|---|
| 9,005,571 | B2* | 4/2015 | Biniwale | ................ B01J 23/464 |
| | | | | 423/650 |
| 9,660,284 | B2* | 5/2017 | Shimada | ............. H01M 8/0618 |
| 2009/0020418 | A1* | 1/2009 | Sugai | ..................... B01J 8/0285 |
| | | | | 204/275.1 |
| 2011/0274994 | A1* | 11/2011 | Carrier | ..................... C01B 3/22 |
| | | | | 429/419 |

OTHER PUBLICATIONS

European Search Report, EP Patent Application No. 15767992.9, dated Nov. 28, 2017, 8 pps.

\* cited by examiner

SYSTEM AND METHOD FOR PRODUCING HYDROGEN

TECHNICAL FIELD

The present invention relates to a system and a method for producing hydrogen by dehydrogenation of an organic hydride, and in particular to the utilization of the heat that is required for the dehydrogenation reaction.

BACKGROUND OF THE INVENTION

The organic chemical hydride process for hydrogenating aromatic compounds such as toluene has recently been developed for the purposes of storing and transporting hydrogen in the form of organic hydrides. According to this process, hydrogen is converted into an organic hydride at the site of hydrogen production, and transported in the form of the organic hydride. The organic hydride is separated into the hydrogen and the aromatic compound at a plant or a hydrogen station located near a city or other user of hydrogen by dehydrogenating the organic hydride. The aromatic compound produced from this dehydrogenation process is transported back to the production site of hydrogen to be hydrogenated by hydrogen once again.

The dehydrogenation reaction that is used for producing hydrogen from an organic hydride in the organic chemical hydride process is an endothermic reaction, and, for instance, about 205 kJ/mol of reaction heat is required to generate hydrogen from methylcyclohexane. The reaction heat required for this dehydrogenation reaction may be obtained from the combustion of fossil fuel, but some proposals have been made to use waste heat as the heat source for the dehydrogenation reaction as a part of the effort to minimize the emission of carbon dioxide.

For instance, in a hybrid type hydrogen production/power generation system which produces hydrogen by the dehydrogenation reaction of an organic hydride in the presence of a dehydrogenation catalyst in a dehydrogenation reaction vessel, and uses the produced hydrogen as fuel for the power generation unit, it is known to use the heat recovered from the high temperature exhaust gas of the power generation unit (typically comprising a gas turbine) for the heat required for the dehydrogenation reaction in the dehydrogenation reaction vessel. (See Patent Document 1)

PRIOR ART DOCUMENT(S)

Patent Document(s)

[Patent Document 1] JP2012-206909A

SUMMARY OF THE INVENTION

Tasks to be Accomplished by the Invention

However, the prior art disclosed in Patent Document 1 does not easily allow the temperature of the dehydrogenation reaction to be within an appropriate range because the difference between the appropriate temperature range for the dehydrogenation reaction (350° C. to 380° C.) and the temperature of the exhaust gas or the like that is used as the heat source is so great, and the heat transfer efficiency in the heat exchange using exhaust gas is relatively poor. When the temperature of the dehydrogenation reaction rises excessively, coking which is a primary reason for the degradation of the dehydrogenation catalyst tends to occur, and undesired byproducts such as benzene may be produced (or reaction selectivity may be reduced).

The present invention was made in view such a problem of the prior art, and has a primary object to provide a system and a method which allow hydrogen to be produced both efficiently and in a stable manner when using exhaust gas produced by power generation as a heat source for the dehydrogenation reaction, by controlling the temperature of the dehydrogenation reaction within an appropriate range, and minimizing the degradation of the dehydrogenation catalyst and the reduction in the reaction selectivity of the dehydrogenation reaction.

MEANS TO ACCOMPLISH THE TASK

According to a first aspect of the present invention, the present invention provides a system (1) for producing hydrogen, comprising: a dehydrogenation reaction unit (51) for producing hydrogen from an organic hydride by a dehydrogenation reaction in presence of a dehydrogenation catalyst; a first power generation unit (2) for generating electric power from energy of combustion gas produced by combustion of fuel; a waste heat recovery unit (3) for receiving heat from exhaust gas expelled from the first power generation unit; a heat exchanger (21) provided in the waste heat recovery unit for exchanging heat between the exhaust gas and a heat medium; and a circulation line (L1- L3) for introducing the heat medium heated in the heat exchanger to the dehydrogenation reaction unit in liquid form, and returning the heat medium expelled from the dehydrogenation reaction unit to the heat exchanger; wherein the heat medium is introduced into the dehydrogenation reaction unit at an introduction temperature ranging between 352° C. and 392° C., the heat medium is expelled from the dehydrogenation reaction unit at an expulsion temperature ranging between 337° C. and 367° C., and a difference between the introduction temperature and the expulsion temperature ranges between 10° C. and 50° C.

In the system for producing hydrogen based on the first aspect of the present invention, because, in an arrangement for using the exhaust gas of power generation as a heat source for the dehydrogenation reaction, a heat medium (in liquid form) demonstrating a higher heat transfer coefficient than the exhaust gas is used as the heat source for the dehydrogenation reaction, it has become possible to control the inlet temperature of the heat medium entering the dehydrogenation reaction unit, the outlet temperature of the heat medium leaving the dehydrogenation reaction unit and the temperature difference of the heat medium as it enters and leaves the dehydrogenation reaction unit to be within appropriate ranges so that hydrogen can be produced in an efficient and stable manner without suffering from various problems such as the degrading of the dehydrogenation catalyst and the lack of selectivity in the dehydrogenation reaction.

According to a second aspect of the present invention, in conjunction with the first aspect of the present invention, the waste heat recovery unit (22, 23) further comprises an at least one steam generation unit for generating steam by using heat from the exhaust gas.

In the system for producing hydrogen based on the second aspect of the present invention, the heat of the exhaust gas can be utilized in an even more efficient manner by using the heat of the exhaust gas of the first power generation unit for producing steam.

According to a third aspect of the present invention, in conjunction with the first or the second aspect of the present invention, the steam generation unit comprises a high pressure steam generation unit (22) for generating high pressure steam, and a low pressure steam generation unit (23) for generating low pressure steam, and the system further comprises a second power generation unit (4) for generating electric power from energy of the high pressure steam generation unit and the low pressure steam generation unit.

In the system for producing hydrogen based on the third aspect of the present invention, by generating high pressure and low pressure steams by using the heat of the exhaust gas from the first power generation unit, the heat of the exhaust gas can be effectively utilized, and the flexibility in the use of the generated steam can be enhanced.

According to a fourth aspect of the present invention, in conjunction with the second or the third aspect of the present invention, the first power generation unit comprises a combustor (12) for combusting the fuel, and the steam is injected into the combustor.

In the system for producing hydrogen based on the fourth aspect of the present invention, by injecting the high pressure steam generated by using the heat of the exhaust gas of the first power generation unit into the combustor, the emission of nitride oxides from the combustor can be minimized.

According to a fifth aspect of the present invention, in conjunction with any one of the first to the fourth aspects of the present invention, the system further comprises a heating unit (54) for heating at least part of the heat medium circulating in the circulation line.

In the system for producing hydrogen based on the fifth aspect of the present invention, by providing the heating unit for reheating the heat medium, the temperature of the heat medium introduced into the dehydrogenation reaction unit can be adjusted to be within an appropriate range so that the amount of hydrogen that is produced by the dehydrogenation reaction unit can be controlled by changing the reaction temperature of the dehydrogenation reaction by means of the adjustment of the heat medium temperature within this temperature range. Even when the heat exchanger or associated equipment for recovering the heat from the exhaust gas for use in the dehydrogenation reaction should fail, it can be backed up without any difficulty.

According to a sixth aspect of the present invention, in conjunction with any one of the first to the fifth aspects of the present invention, the fuel comprises hydrogen produced by the dehydrogenation reaction unit.

In the system for producing hydrogen based on the sixth aspect of the present invention, the hydrogen produced by the dehydrogenation of the organic hydride can be effectively utilized as the fuel for power generation so that the supply balance in relation with other hydrogen users can be maintained in a stable manner.

According to a seventh aspect of the present invention, in conjunction with the second or the third aspect of the present invention, the system further comprises an evaporator (32) for vaporizing water and a superheater (33) for superheating the vaporized water, wherein the evaporator is provided downstream of the heat exchanger, and the superheater is provided upstream of the heat exchanger.

In the system for producing hydrogen based on the seventh aspect of the present invention, the temperature of the generated steam can be raised so that the flexibility in the usage of the hydrogen can be enhanced.

According to an eighth aspect of the present invention, the present invention provides a method for producing hydrogen, comprising: a dehydrogenation reaction step for producing hydrogen from an organic hydride by a dehydrogenation reaction in presence of a dehydrogenation catalyst; a first power generating step for generating electric power from energy of combustion gas produced by combustion of fuel; a waste heat recovery step for receiving heat from exhaust gas from the first power generating step; and a heat exchanging step for exchanging heat between the exhaust gas and a heat medium in the waste heat recovery step; wherein the heat medium heated in the heat exchanging step is used as a heat source in the dehydrogenation reaction step in liquid form, and after the heat medium has been used, the heat medium is reheated in the heat exchanging step, and wherein the heat medium that is about to be used in the dehydrogenation reaction step has a temperature ranging between 352° C. and 392° C., the heat medium that has been used in the dehydrogenation reaction step has a temperature ranging between 337° C. and 367° C., and a difference between the temperatures of the heat medium before and after having been used in the dehydrogenation reaction step ranges between 10° C. and 50° C., preferably between 20° C. and 40° C.

EFFECT OF THE INVENTION

As discussed above, according to the present invention, when using the exhaust gas of power generation as the heat source for a dehydrogenation reaction, hydrogen can be produced in an efficient and stable manner by controlling the reaction temperature of the dehydrogenation reaction to be within an appropriate range, and thereby minimizing the degradation of the dehydrogenation catalyst and the reducing in the reaction selectivity.

DETAILED DESCRIPTION OF PREFERRED EMBODIMENT(S)

A preferred embodiment of the present invention is described in the following with reference to the appended drawings.

Figure 1:
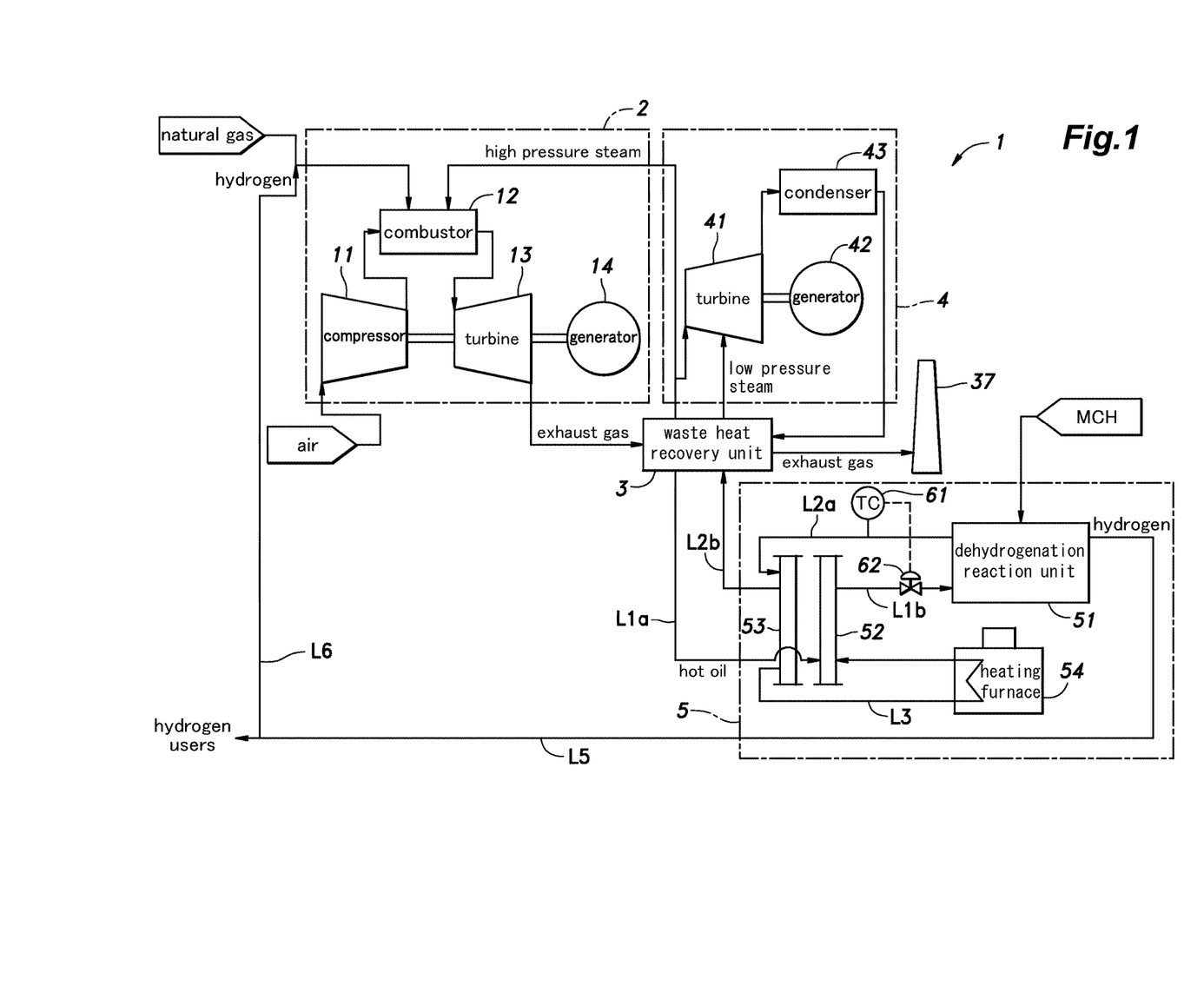
FIG. 1 is a block diagram showing the simplified overall structure of a hydrogen production system embodying the present invention.
Figure 2:
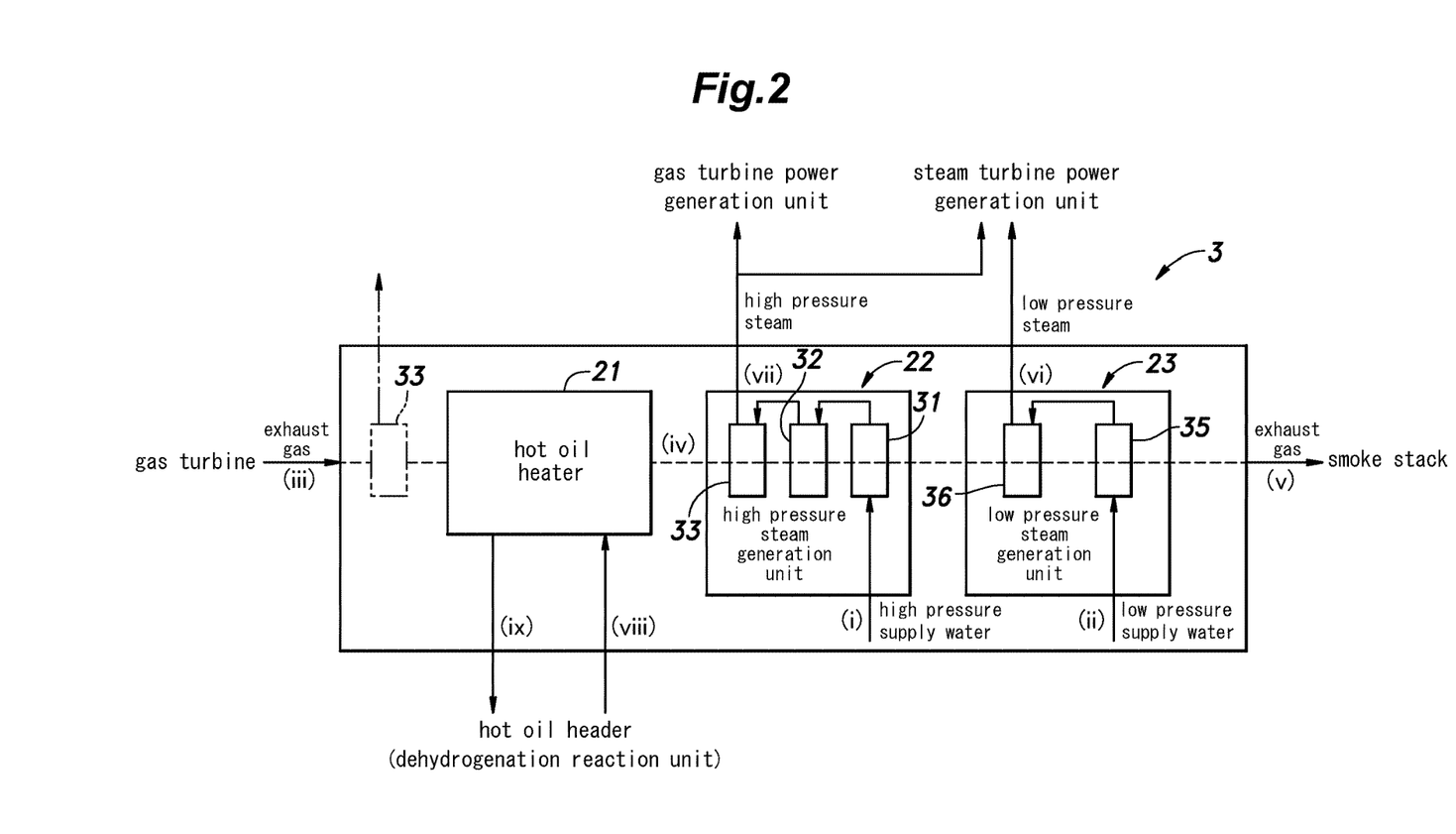
FIG. 2 is a schematic diagram showing the details of the waste heat recovery unit shown in FIG. 1.

FIG. 1 is a block diagram showing the simplified overall structure of a hydrogen production system embodying the present invention, and FIG. 2 is a schematic diagram showing the details of the waste heat recovery unit 3 shown in FIG. 1.

As shown in FIG. 1, the hydrogen production system 1 primarily consists of a gas turbine power generation unit (first power generation unit) 2 for generating electric power from the energy of the combustion gas produced by the combustion of fuel, a waste heat recovery unit 3 for recovering the heat of the exhaust gas expelled from the gas turbine power generation unit 2, a steam power generation unit (second power generation unit) 4 for generating electric power from the energy of the steam generated by the waste heat recovery unit 3 and a hydrogen production unit 5 for producing hydrogen by the dehydrogenation reaction of an organic hydride in the presence of a dehydrogenation catalyst by using the liquid medium (hot oil in this case) heated by the waste heat recovery unit 3.

The gas turbine power generation unit 2 comprises a compressor 11 for compressing air for combustion supplied from outside, a combustor 12 for producing high temperature, high pressure combustion gas by combusting fuel supplied from outside by using the compressed air supplied by the compressor 11, a gas turbine 13 rotatively driven by the combustion gas and a power generator 14 connected to the gas turbine 13.

In the gas turbine power generation unit 2, the energy of the combustion gas is converted into the rotational kinetic energy of the turbine wheel (not shown in the drawings) of the gas turbine 13 as the combustion gas produced from the combustor 12 rotates the turbine wheel, and the kinetic energy of the turbine wheel is converted into electric power by the power generator 14 (first power generation step). The fuel that is used by the combustor 12 may consist of natural gas optionally mixed with a suitable amount of hydrogen. The high temperature, high pressure exhaust gas expelled from the gas turbine 13 is supplied to the waste heat recovery unit 3.

The illustrated embodiment consists of an example where the exhaust gas (waste heat) of the gas turbine power generator is used as a heat source for the dehydrogenation reaction in the hydrogen production unit 5, but any power generator other than the gas turbine power generation unit 2 can also be used as long as it produces waste heat that can be used as a heat source for the dehydrogenation reaction. However, in view of maintaining the demand/supply balance of the hydrogen that is produced by the hydrogen production unit 5, it is desirable to use a power generator that can use hydrogen at least as a part of the fuel.

As shown in FIG. 2, the waste heat recovery unit 3 includes a hot oil heater (heat exchanger) 21 for heating the hot oil, a high pressure steam generation unit 22 for generating high pressure steam (about 30.9 barA, in this case) and a low pressure steam generation unit 23 for generating low pressure steam (about 3.2 barA, in this case), making use of the high temperature exhaust gas introduced from the gas turbine 13 in each instance. Table 1 given in the following shows the material balance and the heat balance in the waste heat recovery unit 3. Columns (i) to (ix) in Table 1 show the values at the various positions of the waste heat recovery unit 3 indicated by the corresponding roman numerals (i) to (ix) in FIG. 2.

exhaust gas (about 370° C. in this case). The hot oil is introduced into the hot oil heater 21 at a flow rate of about 972 t/hr. The hot oil which was low in temperature (about 352° C. in this case) exchanges heat with the exhaust gas before being forwarded to the hydrogen production unit 5 (hot oil header) as a high temperature hot oil (about 382° C. in this case).

The hot oil may be a mixture of diphenyl oxide and biphenyl, but may also consist of any other well-known heat medium (such as synthetic heat medium) which is provided with a required chemical stability and in liquid form (or does not substantially vaporize) under the temperature condition for use as a heat source for the dehydrogenation reaction (which will be discussed hereinafter).

The high pressure steam generation unit 22 is provided on the downstream side of the hot oil heater 21 in the waste heat recovery unit 3 so as to generate high pressure steam by using the heat of the exhaust gas that has passed through the hot oil heater 21. The high pressure steam generation unit 22 includes an economizer (preheater) 31 for preheating the high pressure supply water for steam generation, an evaporator 32 for evaporating the water under high pressure for steam generation and a superheater 33 for superheating the vaporized supply water, in that order from the downstream end (with respect to the flow of the exhaust gas).

As shown in Table 1, the exhaust gas introduced into the high pressure steam generation unit 22 at the temperature of about 370° C. heats the high pressure supply water before being forwarded to the low pressure steam generation unit 23. The high pressure supply water is supplied to the high pressure steam generation unit 22 at a flow rate of about 20 t/hr. The high pressure supply water at a relative low temperature (about 121° C. in this case) is heated by the exhaust gas, and is then forwarded to the gas turbine power generation unit 2 and the steam power generation unit 4 as a high pressure steam of a higher temperature (about 352° C. in this case).

The high pressure steam forwarded to the gas turbine power generation unit 2 is injected into the combustion chamber of the combustor 12 for cooling the flame peak temperature thereof As a result, the combustion temperature

TABLE 1

| No. | | (i) | (ii) | (iii) | (iv) | (v) | (vi) | (vii) | (viii) | (ix) |
|---|---|---|---|---|---|---|---|---|---|---|
| flow rate | [t/h] | 20 | 13 | 346 | 346 | 346 | 13 | 20 | 972 | 972 |
| pressure | [Bar] | 40.4 | 4.1 | — | — | — | 3.2 | 30.9 | — | — |
| temperature | [° C.] | 121 | 120 | 556 | 370 | 149 | 175 | 352 | 352 | 382 |
| heat flow | [GJ/h] | 10.24 | 6.77 | 302.17 | 222.33 | 139.40 | 37.70 | 61.32 | 879.73 | 954.70 |

The hot oil heater 21 is placed at the most upstream end of the waste heat recovery unit 3 (where the exhaust gas of the highest temperature flows) to heat the hot oil such that the temperature of the hot oil stays within a prescribed temperature range by exchanging heat between the exhaust gas and the hot oil that circulates between the waste heat recovery unit 3 and the hydrogen production unit 5 which will be described hereinafter. The hot oil heater may consist of well-known heat exchanger such as a fin tube heat exchanger.

As shown in Table 1, the exhaust gas is introduced into the hot oil heater 21 at a flow rate of about 346 t/hr. After exchanging heat with the hot oil, the high temperature exhaust gas (about 556° C. in this case) flows toward the high pressure steam generation unit 22 as a low temperature of the combustor 12 is lowered so that the emission of nitrogen oxides (NOx) therefrom can be minimized.

The low pressure steam generation unit 23 is provided on the downstream side of the high pressure steam generation unit 22 (or the most downstream end) in the waste heat recovery unit 3 so that low pressure steam may be generated by using the heat of the exhaust gas that has passed through the high pressure steam generation unit 22. The low pressure steam generation unit 23 includes an evaporator 35 for evaporating the low pressure supply water and a superheater 36 for superheating the low pressure supply water that has evaporated, in that order from the downstream end (with respect to the flow of the exhaust gas).

As shown in Table 1, the exhaust gas introduced into the low pressure steam generation unit 23 is used for heating the low pressure supply water, and is expelled therefrom as a low temperature exhaust gas before being finally released to the atmosphere from a stack 37 (See FIG. 1). The low pressure supply water is introduced into the low pressure steam generation unit 23 at a flow rate of about 13 t/hr. The low pressure supply water at a relatively low temperature (about 120° C. in this case) is heated by the exhaust gas, and is forwarded to the steam power generation unit 4 as a low pressure steam of a high temperature (about 175° C. in this case).

As discussed above, heat is exchanged between the exhaust gas and the heat medium (heat exchange step) in the hot oil heater 21 of the waste heat recovery unit 3. The heat recovery from the exhaust gas expelled from the gas turbine power generation unit 2 (heat exchange step) is accomplished by using the heat of the exhaust gas for generating high pressure steam in the high pressure steam generation unit 22 (high pressure steam generation step), and generating low pressure steam in the low pressure steam generation unit 23 (low pressure steam generation step).

The structure of the steam power generation unit 4 is not limited to the one described herein, but may be modified in various different ways. For instance, as shown in the double-dot chain-dot line in FIG. 2, the superheater 33 in the high pressure steam generation unit 22 may be provided on the upstream side of the hot oil heater 21. Thereby, the temperature of the high pressure steam may be raised, and hence the output of the steam power generation unit 4 (or the steam turbine 41 which will be described hereinafter) may be increased. The superheater 36 of the low pressure steam generation unit 23 may be similarly placed upstream of the hot oil heater 21.

The steam power generation unit 4 includes a steam turbine 41 actuated by steam, a power generator 42 connected to the steam turbine 41 and a condenser 43 for cooling and condensing the steam expelled from the steam turbine 41.

In the steam power generation unit 4, the turbine wheel (not shown in the drawings) of the steam turbine 41 is rotated by the high pressure steam and the low pressure steam that are introduced into the high pressure stage and the lower pressure stage of the steam turbine 41, respectively, from the waste heat recovery unit 3 so that the energy of the steam is converted into the rotational kinetic energy of the turbine wheel, and further, the rotational kinetic energy of the turbine wheel of the steam turbine 41 is converted by the power generator 42 into electric power (second power generation step). The steam expelled from the steam turbine 41 is condensed in the condenser 43, and the resulting water is circulated back to the waste heat recovery unit 3 to be used as the low pressure supply water and the high pressure supply water.

In the illustrated embodiment, the steam produced by the waste heat recovery unit 3 was used for the steam power generation unit 4 (the steam turbine 41). However, the steam may also be used for other purposes without departing from the spirit of the present invention.

The hydrogen production unit 5 is provided with a dehydrogenation reaction unit 51 for producing hydrogen by the dehydrogenation of the organic hydride according to the organic chemical hydride process. The hydrogen production unit 5 is also provided with heat medium supply lines L1a and L1b, and heat medium expulsion lines L2a and L2b for returning the hot oil expelled from the dehydrogenation reaction unit 51 to the hot oil heater 21. An inlet side hot oil header 52 is provided between the two heat medium supply lines L1a and L1b, and an outlet side hot oil header 53 is provided between the two heat medium expulsion lines L2a and L2b. Furthermore, a heating furnace (heating unit) 54 is provided in a connection line L3 connecting the outlet side hot oil header 53 with the inlet side hot oil header 52 to reheat the hot oil from the heat medium expulsion line L2b. These lines included in the hydrogen production unit 5 may be provided with pipes, valves and pumps (not shown in the drawings with any details) for transporting the hot oil, and form a circulation line for circulating the hot oil between the hot oil heater 21 and the dehydrogenation reaction unit 51.

The dehydrogenation reaction unit 51 is configured to produce hydrogen and an aromatic compound (toluene in this case) from the organic hydride (methylcyclohexane (MCH) in this case) by the dehydrogenation reaction in the presence of a dehydrogenation catalyst (dehydrogenation reaction step). The dehydrogenation reaction unit 51 consists of a per se known fixed-bed multi-tube reactor of a heat exchanger type including a plurality of reaction tubes filled with dehydrogenation catalyst (solid catalyst) and received in a shell. MCH supplied from a storage facility (such as storage tanks) not shown in the drawings is fed into the reaction tubes of the dehydrogenation reaction unit 51, and flows therein in contact with the catalyst. The hot oil is supplied into the shell via the heat medium supply lines L1a and L1b so that heat is exchanged between the hot oil and the reaction tubes to heat the MCH and the dehydrogenation catalyst.

In the dehydrogenation reaction unit 51, toluene ($C_7H_8$) and hydrogen are produced from MCH ($C_7H_{14}$) by the dehydrogenation reaction of the MCH that can be represented by Chemical Equation (1) given in the following. This dehydrogenation reaction is an endothermic reaction ($\Delta H_{298}$=205 kJ/mol) so that in this chemical equilibrium, the conversion of MCH into toluene and hydrogen is promoted by a high temperature, low pressure condition.

(1)

In the dehydrogenation reaction unit 51, the inlet temperature (the temperature of the reactant in the supply inlet) of the catalyst reaction vessel is the highest, and the reaction temperature drops as one moves toward the outlet side of the catalyst reaction vessel (or as the endothermic reaction progresses). Therefore, the outlet temperature (the temperature of the product at the outlet) of the catalyst reaction vessel is lower than the inlet temperature. In this case, the reaction temperature of the dehydrogenation reaction is controlled to be within the range of about 350° C. to 380° C. so that a favorable conversion ratio and reaction selectivity of the dehydrogenation reaction can be achieved. The reaction pressure of the dehydrogenation reaction ranges between 0.1 MPaG and 1.0 MPaG. The LHSV (liquid hourly space velocity) of MCH depends on the activity level of the catalyst, but may range between 0.5 $h^{-1}$ to 5.0 $h^{-1}$.

The reaction temperature of the dehydrogenation reaction is dictated by the temperature of the introduced hot oil and the flow rate thereof. One of the heat medium expulsion lines L2a is provided with a temperature detector 61 for detecting the temperature of the hot oil that is expelled from the dehydrogenation reaction unit 51. The other heat medium expulsion line L1a is provided with a flow rate regulator valve 62 for adjusting the flow rate of the hot oil that is introduced into the dehydrogenation reaction unit 51 according to the temperature detected by the temperature detector 61.

The heating of the hot oil in the waste heat recovery unit 3 is carried out such that the temperature of the hot oil introduced into the dehydrogenation reaction unit 51 from the heat medium expulsion line L1a is controlled to be within a range of 352° C. to 392° C., or more preferably within a range of 365° C. to 385° C. If this temperature is lower than 352° C., the equilibrium does not favor the reaction, and the heat exchange efficiency is poor. If the temperature is higher than 392° C., the heat medium may be thermally degraded to such an extent that the desired heat exchange efficiency cannot be attained.

Because the hot oil introduced into the dehydrogenation reaction unit 51 is in liquid form, the hot oil demonstrates a higher heat transfer coefficient and a greater thermal capacity than the exhaust gas so that the heat transfer efficiency in the reaction vessel can be improved as compared to the case where the exhaust gas from the gas turbine power generation unit 2 is directly introduced into the dehydrogenation reaction unit 51. As a result, owing to the use of the hot oil as the heat source for the dehydrogenation reaction, the necessary heat transfer area for heat transfer to the reaction vessel of the dehydrogenation reaction unit 51 can be reduced, and the necessary amount of the catalyst can be reduced, as compared to the case where the exhaust gas is used as the heat source. More specifically, the heat transfer coefficient of the outer surface of the heat transfer tube can be increased by five folds, and the necessary heat transfer area can be reduced by up to 50%. The temperature of the hot oil that is introduced into the dehydrogenation reaction unit 51 may be significantly lower than that is required if the exhaust gas were to be directly introduced into the dehydrogenation reaction unit 51 (at a temperature higher than 500° C.) as a heat medium owing to the high thermal transfer efficiency of the hot oil so that the adverse effect (such as the reduction in the activity of the catalyst) on the reaction vessel and the associated parts that may be otherwise caused by the high temperature of the heat medium can be avoided.

The flow rate of the hot oil is controlled by the flow rate regulator valve 62 such that the outlet temperature (the temperature detected by the temperature detector 61) of the hot oil expelled from the dehydrogenation reaction unit 51 is in the range of 337° C. to 367° C., or more preferably in the range of 347° C. to 357° C.

The temperature difference between the hot oil introduced into the dehydrogenation reaction unit 51 and the hot oil expelled from the dehydrogenation reaction unit 51 may be controlled to be in the range of 10° C. to 50° C., more preferably in the range of 20° C. to 40° C., or most preferably in the range of 25° C. to 35° C. If the temperature difference is less than 10° C., an excessive amount of hot oil will be required. If the temperature difference is greater than 50° C., the thermal transfer is so poor that an excessively large reaction vessel volume will be required. According to the present invention, the temperature difference can be reduced by about half as compared to the prior art.

In the heating furnace 54, the hot oil passed through a heating coil tube is heated by the combustion heat of a prescribed fuel. The temperature of the hot oil that is introduced into the dehydrogenation reaction unit 51 can be adjusted to be within a prescribed range by appropriately heating the hot oil with the heating furnace 54, and also by varying the temperature of the hot oil within this range, the reaction temperature of the dehydrogenation reaction can be changed such that the amount of hydrogen that is produced in the dehydrogenation reaction unit 51 can be controlled. If any fault should occur to the heating furnace, a suitable backup can be prepared without any difficulty. The means for heating the hot oil is not limited to the heating furnace 54, but may consist of any other heating unit as long as it is capable of heating the hot oil at least to the prescribed temperature.

The hydrogen produced by the dehydrogenation reaction unit 51 is forwarded to hydrogen users such as cities and towns via a first hydrogen supply line L5. A part of this hydrogen is forwarded to the gas turbine power generation unit 2 via a second hydrogen supply line L6 which branches off from the first hydrogen supply line L5, and after being mixed with natural gas or individually, forwarded to the combustor 12 to be combusted therein. By thus using the hydrogen produced by the dehydrogenation reaction unit 51 for the fuel for power generation (hydrogen-mixed power generation), electric power can be produced by effectively utilizing the hydrogen so that the supply balance in relation with other hydrogen users can be maintained in a stable manner.

Although not shown in the drawings in any detail, the toluene produced by the dehydrogenation reaction unit 51 is separated from the hydrogen, and is stored in a toluene storing facility (such as storage tanks). The stored toluene is supplied to a hydrogenation unit not shown in the drawings to be used as a reactant of the hydrogenation reaction for producing MCH.

The organic hydride serving as the reactant for the dehydrogenation reaction is not limited to MCH, but may consist of a monocyclic organic hydride such as cyclohexane, a bicyclic organic hydride such as tetralin, decaline and methyldecaline, a tricyclic organic hydride such as tetradecahydroanthracene, or a combination of two or more of such organic hydrides. The temperature of the hot oil that is introduced into the dehydrogenation reaction unit 51 may be appropriately selected within the aforementioned temperature range depending on the particular kind of the selected organic hydride.

The aromatic compound that may be produced by the dehydrogenation of the organic hydride is not limited to toluene, but may consist of a monocyclic aromatic compound such as benzene and xylene, a bicyclic aromatic compound such as naphthalene, tetralin and methylnaphthalene, a tricyclic aromatic compound such as anthracene, or a combination of two or more of such aromatic compounds.

The dehydrogenation catalyst may consist of at least one of active metals selected from a group consisting of nickel (Ni), platinum (Pt), palladium (Pd), rhodium (Rh), iridium (Ir) and ruthenium (Ru) carried by a carrier selected from a group consisting of alumina, silica-alumina and silica, but may also consist of any other per se known catalyst used for dehydrogenating an organic hydride.

In particular, uniformly, highly dispersed metal loaded catalysts are highly effective as the dehydrogenation catalyst. In the manufacture of the uniformly, highly dispersed metal loaded catalysts, sulfur or a sulfur compound is substantially uniformly dispersed throughout the cross section of a catalyst carrier in advance, so that catalyst metal is loaded on the carrier substantially in agreement with the distribution of the sulfur or sulfur compound and, as a result, the catalyst metal is substantially uniformly dispersed throughout the cross section of the carrier.

In particular, when the catalyst carrier is based on alumina, the catalyst carrier may preferably consist of a porous gamma-alumina carrier which can be obtained by filtering and washing slurry of aluminum hydroxide prepared by neutralizing an aluminum salt, dehydrating and washing the obtained alumina hydrogel and baking the product for 1 to 6 hours at a temperature of 400° C. to 800° C. More preferably, the catalyst carrier may consist of a porous gamma-alumina carrier which can be obtained by using a pH swing process in which the pH value of the alumina hydrogel is caused to swing between the PH region for alumina hydrogel dissolution and the pH region for boehmite gel precipitation, and the crystals of alumina hydrogel are grown by adding an alumina hydrogel forming substance at least during the transition from one of the pH regions to the other. Such a porous gamma-alumina carrier, when extruded into alumina pellets formed with uniformly dispersed pores, demonstrates very little variations in the physical property between individual pellets so that a catalyst with a high activity level and a high selectivity can be produced with the added advantage of long service lives.

According to the hydrogen production system discussed above, the waste heat produced from power generation can be effectively utilized in a hydrogen production unit 5 based on the organic chemical hydride process by combing a gas turbine power generation unit 2 that can use hydrogen for the fuel and a hydrogen production unit 5. In particular, in an arrangement for using the exhaust gas of a power generator as the heat source of a dehydrogenation reaction, by using hot oil (in liquid form) having a comparatively higher heat transfer efficiency as the heat source for the dehydrogenation reaction, and selecting the temperatures of the hot oil entering and leaving the dehydrogenation reaction unit 51 and the temperature difference of the hot oil as it enters and leaves the dehydrogenation reaction unit 51 to be within appropriate ranges, the temperature of the dehydrogenation reaction unit can be controlled to be within a prescribed temperature range, and hydrogen can be produced in an efficient and stable manner without suffering from various problems such as the degrading of the dehydrogenation catalyst and the lack of selectivity in the dehydrogenation reaction.

The present invention has been described in terms of a concrete embodiment thereof which was given only as an example, and should not be interpreted as limiting the present invention. The various components of the hydrogen production system and the hydrogen production method according to the present invention discussed above can be partly substituted and omitted without departing from the spirit of the present invention.

LIST OF THE NUMERALS

1 hydrogen production system
2 gas turbine power generation unit (first power generation unit)
3 waste heat recovery unit
4 steam power generation unit (second power generation unit)
5 hydrogen production unit
12 combustor
21 hot oil heater (heat exchanger)
22 high pressure steam generation unit
23 low pressure steam generation unit
31 economizer (preheater)
32 evaporator
33 superheater
35 evaporator
36 superheater
51 dehydrogenation reaction unit
52 inlet side hot oil header
53 outlet side hot oil header
54 heating furnace (heating unit)
61 temperature detector
62 flow rate regulator valve
L1a, L1b heat medium supply line (circulation line)
L2a, L2b heat medium expulsion line (circulation line)
L3 connecting line (circulation line)
L5 first hydrogen supply line
L6 second hydrogen supply line

The invention claimed is:

1. A system for producing hydrogen, comprising:
a dehydrogenation reaction unit for producing hydrogen from an organic hydride by a dehydrogenation reaction in presence of a dehydrogenation catalyst;
a first power generation unit for generating electric power from energy of combustion gas produced by combustion of fuel;
a waste heat recovery unit for receiving heat from exhaust gas expelled from the first power generation unit;
a heat exchanger provided in the waste heat recovery unit for exchanging heat between the exhaust gas and a heat medium; and
a circulation line for introducing the heat medium heated in the heat exchanger to the dehydrogenation reaction unit in liquid form, and returning the heat medium expelled from the dehydrogenation reaction unit to the heat exchanger;
wherein the heat medium is introduced into the dehydrogenation reaction unit at an introduction temperature ranging between 352° C. and 392° C.,
the heat medium is expelled from the dehydrogenation reaction unit at an expulsion temperature ranging between 337° C. and 367° C., and
a difference between the introduction temperature and the expulsion temperature ranges between 10° C. and 50° C.

2. The system for producing hydrogen according to claim 1, wherein the waste heat recovery unit further comprises an at least one steam generation unit for generating steam by using heat from the exhaust gas.

3. The system for producing hydrogen according to claim 1, wherein the steam generation unit comprises a high pressure steam generation unit for generating high pressure steam, and a low pressure steam generation unit for generating low pressure steam, and the system further comprises a second power generation unit for generating electric power from energy of the high pressure steam generation unit and the low pressure steam generation unit.

4. The system for producing hydrogen according to claim 2, wherein the first power generation unit comprises a combustor for combusting the fuel, and the steam is injected into the combustor.

5. The system for producing hydrogen according to claim 1, further comprising a heating unit for heating at least part of the heat medium circulating in the circulation line.

6. The system for producing hydrogen according to claim 1, wherein the fuel comprises hydrogen produced by the dehydrogenation reaction unit.

7. The system for producing hydrogen according to claim 2, further comprising an evaporator for vaporizing water and a superheater for superheating the vaporized water, wherein the evaporator is provided downstream of the heat exchanger, and the superheater is provided upstream of the heat exchanger.

8. A method for producing hydrogen, comprising:
a dehydrogenation reaction step for producing hydrogen from an organic hydride by a dehydrogenation reaction in presence of a dehydrogenation catalyst;
a first power generating step for generating electric power from energy of combustion gas produced by combustion of fuel;
a waste heat recovery step for receiving heat from exhaust gas expelled from the first power generating step; and
a heat exchanging step for exchanging heat between the exhaust gas and a heat medium in the waste heat recovery step;
wherein the heat medium heated in the heat exchanging step is used as a heat source in the dehydrogenation reaction step in liquid form, and after the heat medium has been used, the heat medium is reheated in the heat exchanging step, and
wherein the heat medium that is about to be used in the dehydrogenation reaction step has a temperature ranging between 352° C. and 392° C.,
the heat medium that has been used in the dehydrogenation reaction step has a temperature ranging between 337° C. and 367° C., and
a difference between the temperatures of the heat medium before and after having been used in the dehydrogenation reaction step ranges between 10° C. and 50° C.

* * * * *